United States Patent
Hsu et al.

(10) Patent No.: US 8,869,352 B2
(45) Date of Patent: *Oct. 28, 2014

(54) MULTI-SEGMENT ROTARY SHAFT STRUCTURE

(71) Applicant: First Dome Corporation, New Taipei (TW)

(72) Inventors: An Szu Hsu, New Taipei (TW); Way Han Dai, New Taipei (TW)

(73) Assignee: First Dome Corporation, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/770,168

(22) Filed: Feb. 19, 2013

(65) Prior Publication Data
US 2014/0174226 A1 Jun. 26, 2014

(30) Foreign Application Priority Data
Dec. 21, 2012 (TW) .............................. 101224879 A

(51) Int. Cl.
E05D 15/00 (2006.01)
E05D 7/00 (2006.01)
E05D 3/12 (2006.01)

(52) U.S. Cl.
CPC ....................................... E05D 3/122 (2013.01)
USPC .................................. 16/368; 16/354; 16/366

(58) Field of Classification Search
USPC .................. 16/366, 368, 369, 370, 354, 365; 403/80, 81
See application file for complete search history.

(56) References Cited

U.S. PATENT DOCUMENTS

| | | | | |
|---|---|---|---|---|
| 3,483,588 A * | 12/1969 | Hover | ............................. | 16/354 |
| 4,599,998 A * | 7/1986 | Castillo | ........................... | 602/16 |
| 5,570,971 A * | 11/1996 | Rixen et al. | ................... | 403/381 |
| 8,562,236 B2 * | 10/2013 | Eikelenboom | .................. | 403/81 |
| 2008/0109995 A1 * | 5/2008 | Kuwajima et al. | ............... | 16/354 |
| 2008/0284295 A1 * | 11/2008 | Lai et al. | ..................... | 312/223.2 |
| 2009/0000062 A1 * | 1/2009 | Yamanami | ...................... | 16/366 |
| 2010/0024169 A1 * | 2/2010 | Self | ................................ | 16/354 |
| 2011/0000136 A1 * | 1/2011 | Brun | ............................... | 49/358 |
| 2011/0097138 A1 * | 4/2011 | Eikelenboom | .................. | 403/81 |
| 2011/0271486 A1 * | 11/2011 | Wang et al. | ..................... | 16/319 |

* cited by examiner

*Primary Examiner* — Jeffrey O Brien
(74) *Attorney, Agent, or Firm* — Rosenberg, Klein & Lee

(57) ABSTRACT

A multi-segment rotary shaft structure includes a driving joint assembly and a driven joint assembly. The driving joint assembly at least includes two opposite joint plates and a middle link plate assembly engaged therebetween. The driven joint assembly is disposed between the opposite joint plates and includes at least two driven plates. Opposite ends of the driven plates are formed with synchronous driving sections drivingly engaged with each other. Inward ends of the opposite joint plates are linked with outward ends of the driven plates. Outward ends of the middle link plate assembly are linked with the inward ends of the driven plates. The driving joint assembly and driven joint assembly are stringed and pivotally connected and combined, whereby the joint plates can be freely rotated around multiple rotational centers.

8 Claims, 11 Drawing Sheets

MULTI-SEGMENT ROTARY SHAFT STRUCTURE

BACKGROUND OF THE INVENTION

1. Field of the Invention

The present invention relates generally to a multi-segment rotary shaft structure, and more particularly to a multi-segment rotary shaft structure applicable to an electronic device. The multi-segment rotary shaft structure has multiple rotational centers so that the rotational freeness of the electronic device is enhanced and two ends of the electronic device can be more smoothly rotated and opened or closed.

2. Description of the Related Art

With a notebook or the like electronic device taken as an example, the notebook is generally composed of a base seat as a system end and an upper cover as a display end. The base seat and the upper cover are pivotally connected with each other via a pivot device, whereby the upper cover can be lifted open around the pivot device for use or reversely closed onto upper surface of the base seat. The pivot device is quite important in that it not only serves as a rotational center of the electronic device, but also needs to provide sufficient support force for locating the display screen of the upper cover in a desired operation angular position, (which is generally 135 degrees with respect to a notebook).

The above conventional pivot device generally includes an assembly having a shaft and an assembly having a sleeve. One of the assemblies is installed on the upper cover, while the other of the assemblies is installed on the base seat with the shaft fitted in the sleeve. In consideration of the support structural strength and operational smoothness, in general, two sets of pivot devices each including a shaft and a sleeve are disposed on two sides of the junction between the upper cover and the base seat of the electronic device (such as a notebook).

The axes of the shafts of the two pivot devices often fail to coincide with each other. Therefore, it often takes place that the upper cover of the electronic device can be hardly coordinately rotated open. Moreover, the rotational freeness of the pivot devices nearly positioned in the same central line is limited. As a result, the upper cover of the electronic device can be hardly smoothly rotated and opened or closed.

SUMMARY OF THE INVENTION

It is therefore a primary object of the present invention to provide a multi-segment rotary shaft structure applicable to an electronic device. By means of the multi-segment rotary shaft structure, the rotational freeness of the electronic device is greatly enhanced.

It is a further object of the present invention to provide the above multi-segment rotary shaft structure, by means of which two ends of the electronic device can be more smoothly opened and closed.

To achieve the above and other objects, the multi-segment rotary shaft structure of the present invention includes at least one driving joint assembly and driven joint assembly. The driving joint assembly at least includes two opposite joint plates and a middle link plate assembly. Inward end of at least one of the two joint plates is formed with synchronous driving section. At least one of two ends of the middle link plate assembly is formed with connection driving section corresponding to the synchronous driving section for synchronously drivingly engaging with the synchronous driving section. The driven joint assembly is pivotally disposed between the opposite joint plates of the driving joint assembly. The driven joint assembly at least includes two opposite driven plates. Inward ends of the two driven plates are formed with synchronous driving sections, which are synchronously drivingly engaged with each other. Inward ends of the joint plates and outward ends of the driven plates are stringed and pivotally connected by means of shaft pins. Two ends of the middle link plate assembly are correspondingly pivotally connected with the inward ends of the driven plates by means of shaft pins. Multiple driving joint assemblies and driven joint assemblies are side by side arranged and combined with the joint plates, the middle link plates and the driven plates stringed and pivotally connected by means of the shaft pins to form the multi-segment rotary shaft structure. The joint plates of the driving joint assembly can be freely rotated around multiple rotational centers.

In the above multi-segment rotary shaft structure, two ends of the joint plates are respectively formed with outward shaft holes and inward shaft holes. The inward ends of the joint plates are formed with inward synchronous driving sections opposite to each other. The two ends of the middle link plate assembly are formed with shaft holes and the two ends of the middle link plate assembly are formed with outward connection driving sections for engaging with the inward synchronous driving sections of the joint plates. The driven plates are respectively formed with two spaced outward shaft holes and two spaced inward shaft holes. The inward shaft holes of the joint plates are respectively aligned with the outward shaft holes of the driven plates and pivotally assembled by means of a first shaft pin and a second shaft pin. The shaft holes of the middle link plate assembly are respectively aligned with the inward shaft holes of the driven plates and pivotally assembled by means of a third shaft pin and a fourth shaft pin.

In the above multi-segment rotary shaft structure, a protrusion is formed on inner circumference of each of the inward shaft holes of the joint plates and the shaft holes of the middle link plate assemblies and the inward shaft holes of the driven plates to press and fasten the shaft pins fitted in the shaft holes so as to provide holding/locating effect.

In the above multi-segment rotary shaft structure, the shaft pins have extension sections and the electronic device is formed with corresponding cavities for receiving the extension sections therein.

The present invention can be best understood through the following description and accompanying drawings, wherein:

DETAILED DESCRIPTION OF THE PREFERRED EMBODIMENTS

Figure 1:
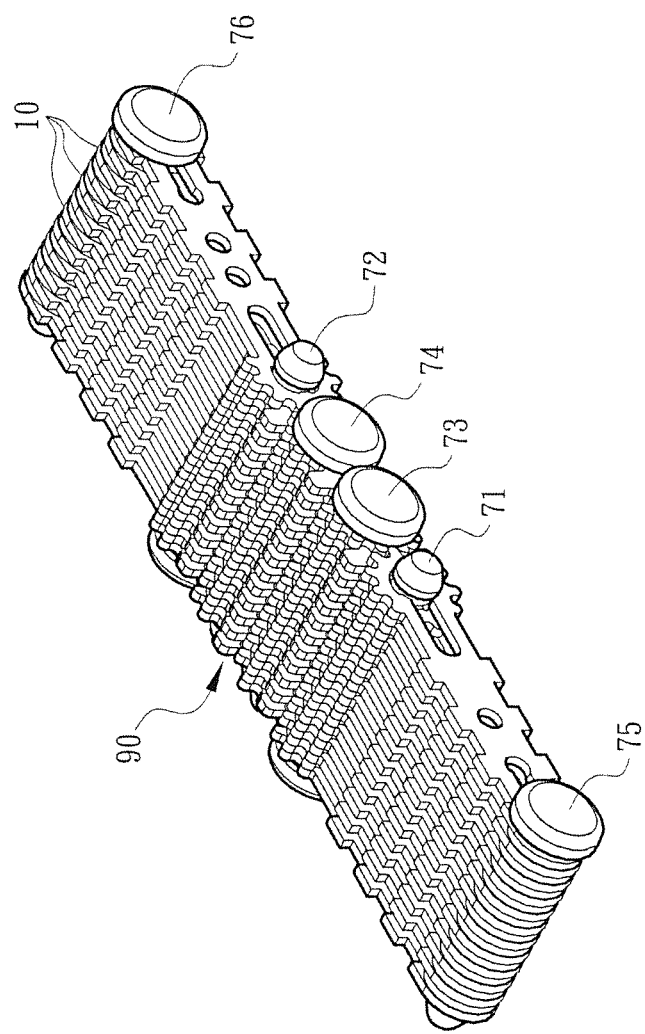
FIG. 1 is a perspective assembled view of a first embodiment of the present invention.
Figure 2:
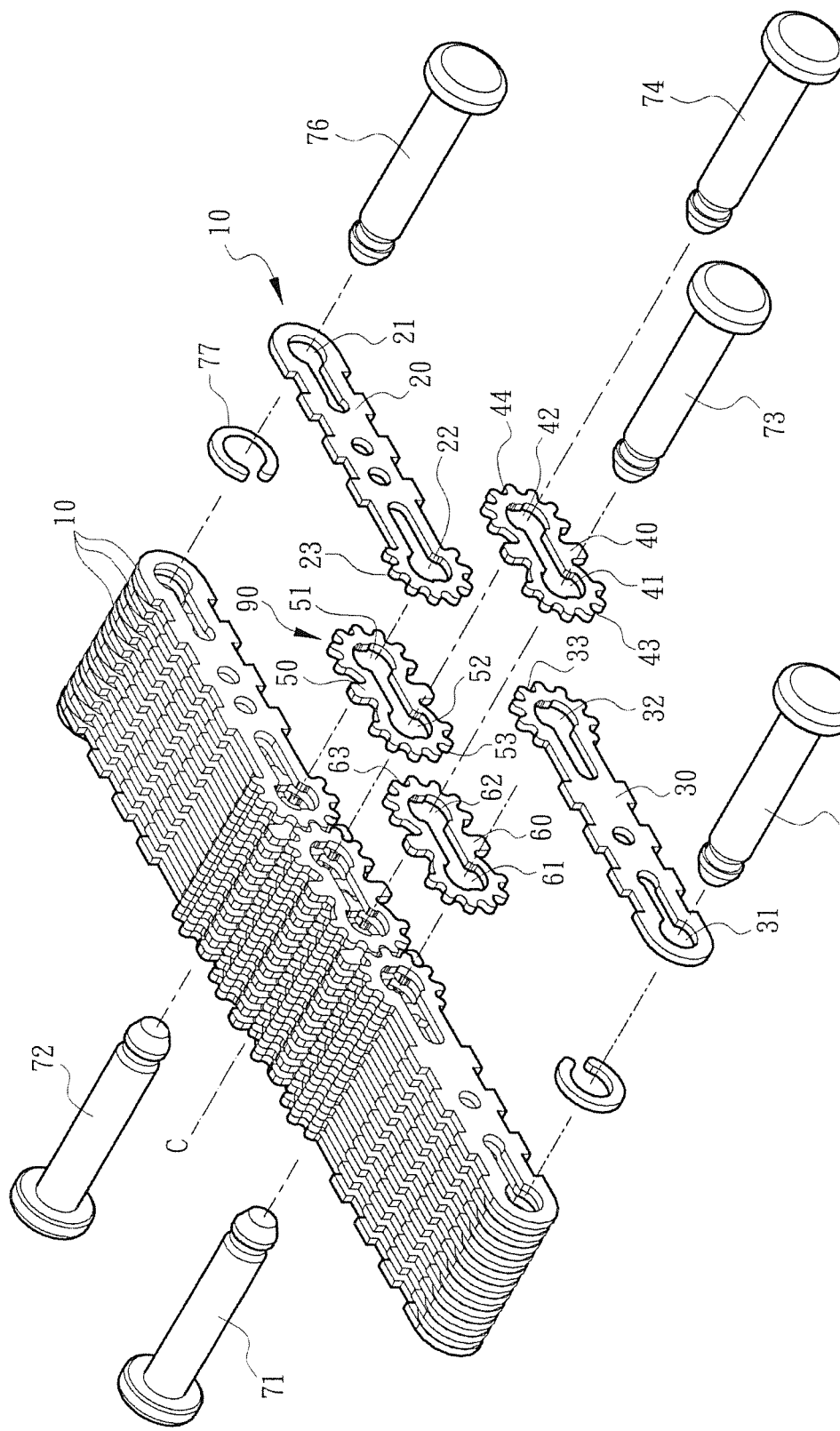
FIG. 2 is a perspective exploded view of the first embodiment of the present invention.
Figure 3:
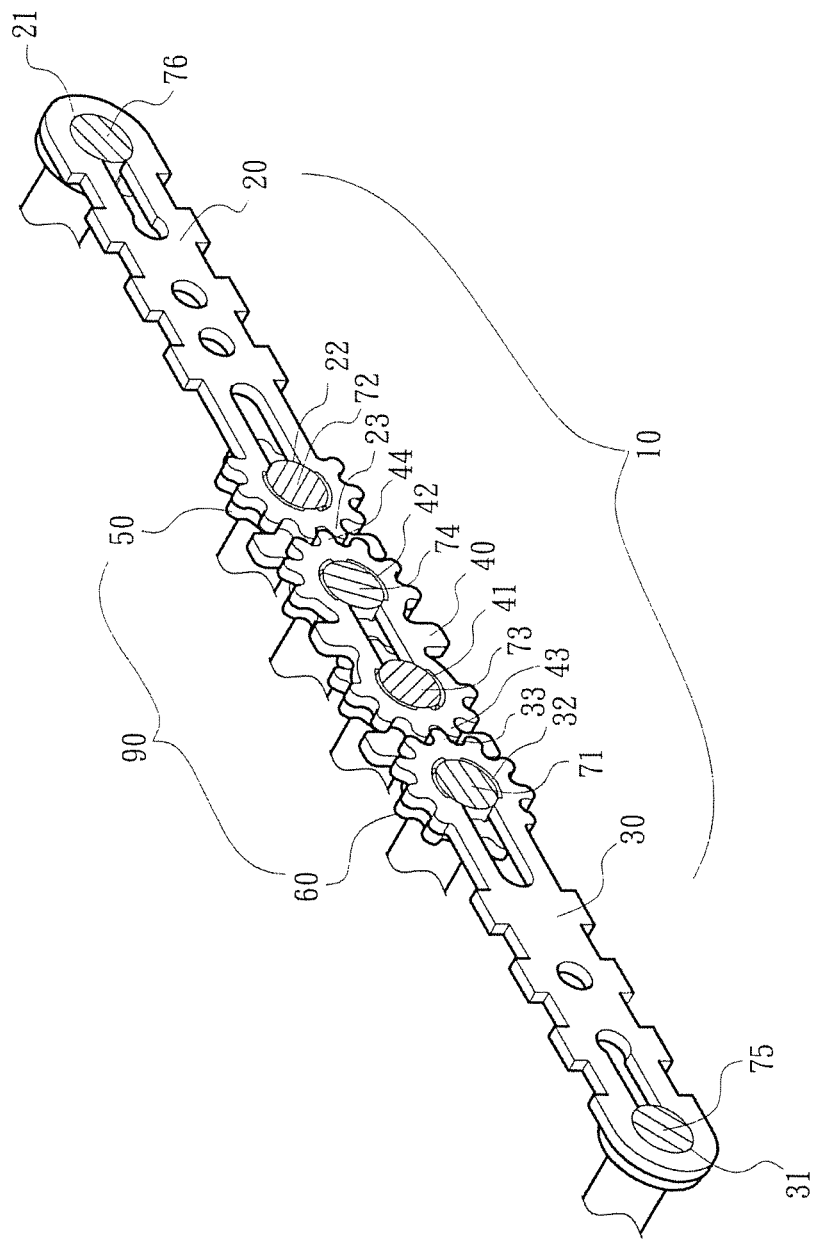
FIG. 3 is a perspective enlarged view of one joint assembly of the present invention.

Please refer to FIGS. 1 to 3. The multi-segment rotary shaft structure of the present invention includes multiple driving joint assemblies 10 and multiple driven joint assemblies 90 (referring to FIG. 3). The driving joint assemblies 10 and the driven joint assemblies 90 are combined with each other via multiple shaft pins to form the multi-segment rotary shaft structure.

In order to facilitate illustration of the connection relationship between the components, a direction toward the central line C of FIG. 2 will be referred to as "inward", while a direction away from the central line C will be referred to as "outward" hereinafter.

The driving joint assembly 10 at least includes a first joint plate 20, a second joint plate 30 opposite to the first joint plate 20 and a middle link plate assembly 40. Two ends of the first and second joint plates 20, 30 are respectively formed with outward shaft holes 21, 31 and inward shaft holes 22, 32. In addition, the inward ends of at least one of the first and second joint plates 20, 30 are formed with synchronous driving sections 23, 33. The middle link plate assembly 40 is drivingly disposed between the first and second joint plates 20, 30 and composed of at least one middle link plate. Two ends of the middle link plate assembly 40 are formed with shaft holes 41, 42. At least one of the two ends of the middle link plate assembly 40 is formed with an outward connection driving section 43, 44 for correspondingly engaging with the inward synchronous driving sections 23, 33 of the first joint plate 20 and/or the second joint plate 30. Accordingly, at least one of the first joint plate 20 and/or the second joint plate 30 is synchronously drivingly engaged with the middle link plate assembly 40.

The driven joint assembly 90 is disposed between two joint plates of the driving joint assembly 10. The driven joint assembly 90 at least includes a first driven plate 50 and a second driven plate 60. The opposite inward ends of the first and second driven plates 50, 60 are formed with synchronous driving sections 53, 63, which are drivingly engaged with each other. The first and second driven plates 50, 60 are respectively formed with two spaced outward shaft holes 51, 61 and two spaced inward shaft holes 52, 62.

The multiple driven joint assemblies 90 and the multiple driving joint assemblies 10 are arranged and combined in such a manner that the inward shaft holes 22, 32 of the first and second joint plates 20, 30 are respectively aligned with the outward shaft holes 51, 61 of the first and second driven plates 50, 60 and pivotally integrally stringed by means of a first shaft pin 71 and a second shaft pin 72. Then the shaft holes 41, 42 at two ends of the middle link plate assembly 40 are respectively aligned with the inward shaft holes 52, 62 of the first and second driven plates 50, 60. Then a third shaft pin 73 and a fourth shaft pin 74 are passed through the shaft holes to assemble the middle link plate assembly 40 and the first and second driven plates 50, 60. Also, a fifth shaft pin 75 and a sixth shaft pin 76 are passed through the aligned outward shaft holes 21, 31 of the first and second joint plates 20, 30 to assemble the same. In this embodiment, gaskets 77 are positioned between the adjacent driving joint assemblies 10. Each of the shaft pins 71~76 has an enlarged end. After the shaft pin is passed through the shaft holes, a retainer member such as a retainer ring is located in an annular groove of the other end of the shaft pin so as to secure the shaft pin. This is only for illustration purposes only, not intended to limit the scope of the present invention.

More driving joint assemblies 10 and driven joint assemblies 90 can be combined. That is, multiple first and second joint plates 20, 30 and multiple middle link plate assemblies 40 and first and second driven plates 50, 60 are stringed and assembled by means of the shaft pins 71~76. Accordingly, all the driving joint assemblies 10 and the driven joint assemblies 90 are stringed in the same manner to form the multi-segment rotary shaft structure.

Figure 4:
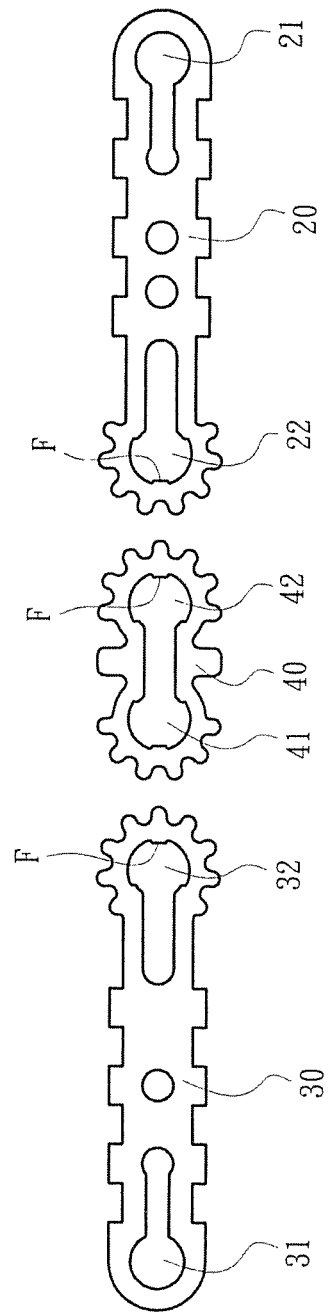
FIG. 4 is a plane view showing the first and second joint plates and the middle link plate assembly of the present invention.

Referring to FIG. 4, in this embodiment, a protrusion F is formed on inner circumference of each of the inward shaft holes 22, 32 of the first and second joint plates 20, 30 and the shaft holes 41, 42 of the middle link plate assemblies 40. Also, a protrusion F is formed on inner circumference of each of the inward shaft holes 52, 62 of the first and second driven plates 50, 60. The protrusions F serve to press and fasten the shaft pins 71~74 fitted in the shaft holes so as to provide a holding/locating effect.

In this embodiment, the first and second driven plates 50, 60 are unnecessary to identical to the middle link plate assembly 40 in configuration. That is, the outward ends of the first and second driven plates 50, 60 can be free from any synchronous driving section. However, it is helpful in mass-production to have the first and second driven plates 50, 60 structurally identical to the middle link plates of the middle link plate assembly 40.

Figure 5:
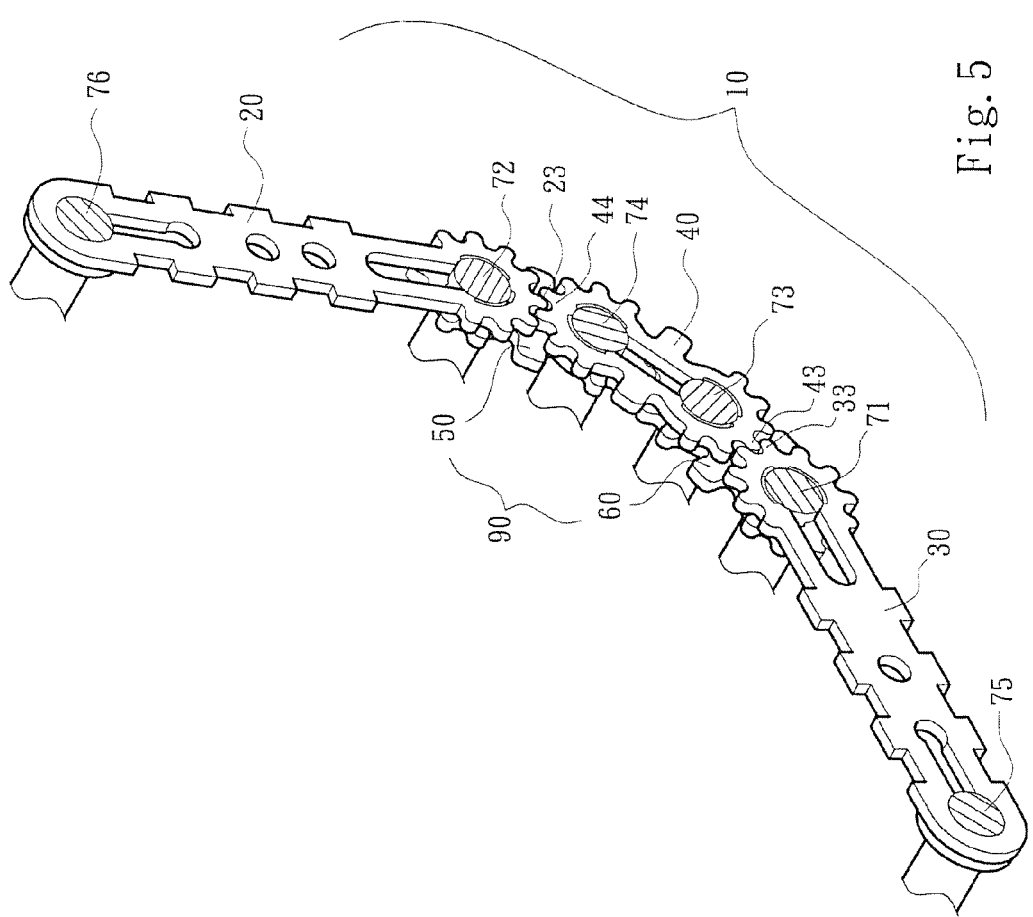
FIG. 5 is a perspective view according to FIG. 3, showing that the joint assembly is preliminarily pivotally rotated.
Figure 6:
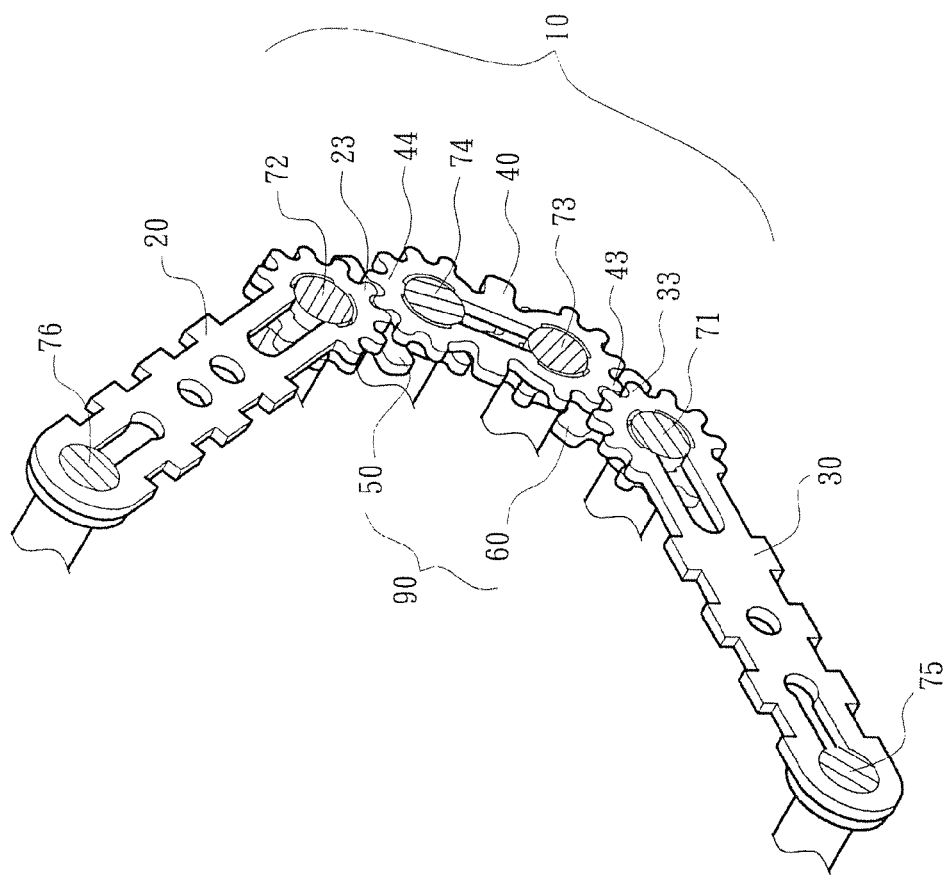
FIG. 6 is a perspective view according to FIG. 5, showing that the joint assembly is further pivotally rotated.
Figure 7:
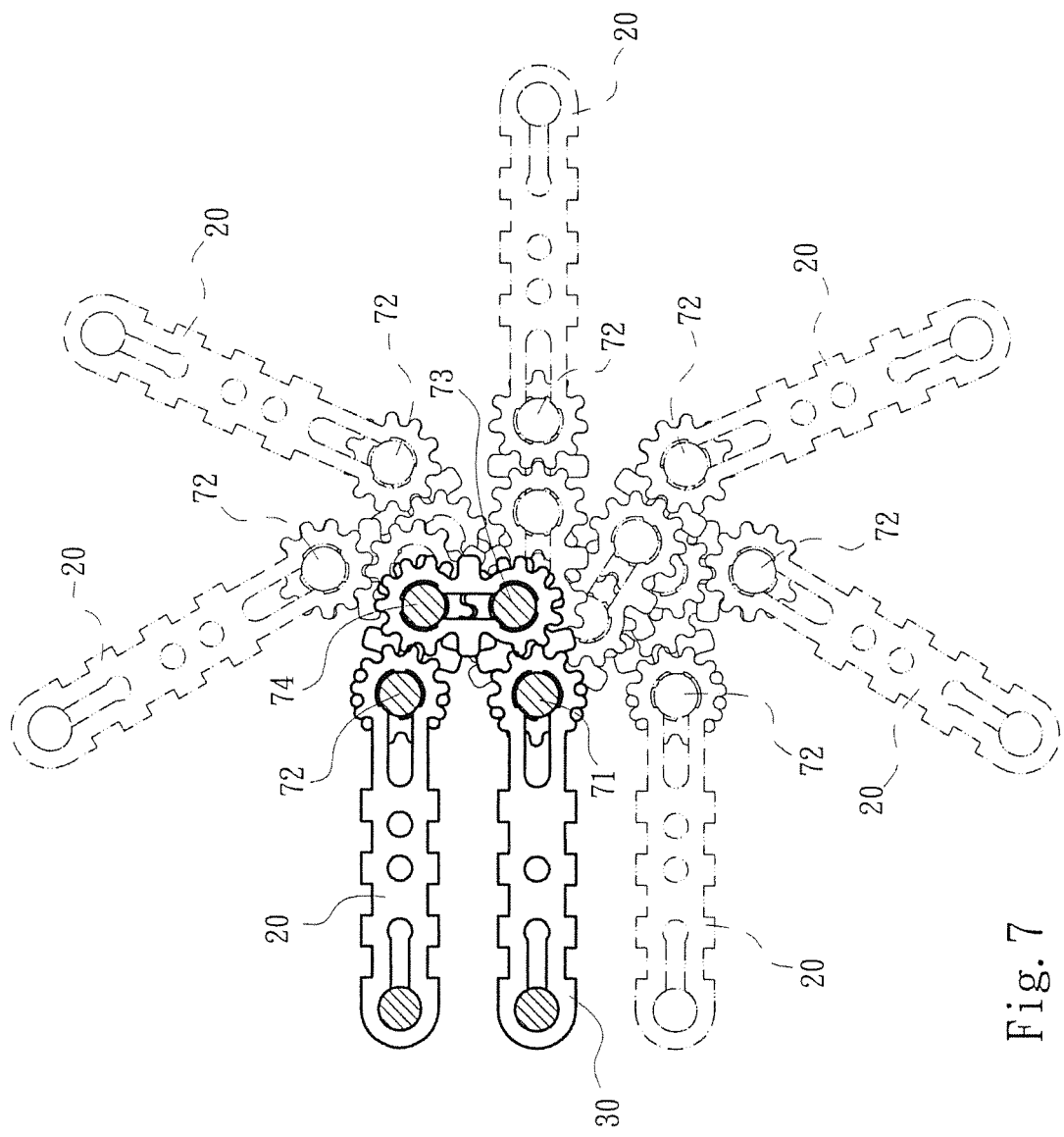
FIG. 7 shows the range of rotational angle of the first embodiment of the present invention.

In this embodiment, the inward synchronous driving section 23 of the first joint plate 20 or the inward synchronous driving section 33 of the second joint plate 30 is drivingly engaged with the outward connection driving section 43 or 44 of the middle link plate assembly 40. Accordingly, referring to FIG. 5, when one of the first and second joint plates 20, 30) of the driving joint assembly 10 is rotated, the first middle link plate of the middle link plate assembly 40 will be rotated in a reverse direction. At this time, the first driven plate 50 of the driven joint assembly 90 is synchronously driven. Accordingly, the entire multi-segment rotary shaft structure is gradually continuously synchronously rotated. That is, when one of the first and second joint plates 20, 30 is forcedly rotated, the other joint plate is synchronously driven and rotated. As shown in FIG. 6 or 7, in the case that the outward end of the first joint plate 20 is clockwise forcedly rotated (from the state of FIG. 6 to the state of FIG. 5), the inward end of the first joint plate 20 will be clockwise rotated along the outer circumference of the outward end of the middle link plate assembly 40 (also referring to FIGS. 2, 3 and 5). At the same time, the outward end of the first driven plate 50 is driven to move in the same direction and the inward end of the first driven plate 50 is also clockwise rotated. The first and second driven plates 50, 60 are drivingly engaged with each other via the synchronous driving sections 53, 63 so that the inward end of the second driven plate 60 is synchronously counterclockwise rotated. At this time, the outward end of the second driven plate 60 is also counterclockwise rotated. In this case, the first and second joint plates 20, 30 can be synchronously rotated in reverse directions about the central line C to open or close. Alternatively, one of the joint plates is rotated toward the other (close) or away from the other (open). It can be seen from FIG. 7 that the two joint plates 20, 30 can be rotated relative to each other through 0~360 degrees. Therefore, the application range of the present invention is very wide.

Figure 8:
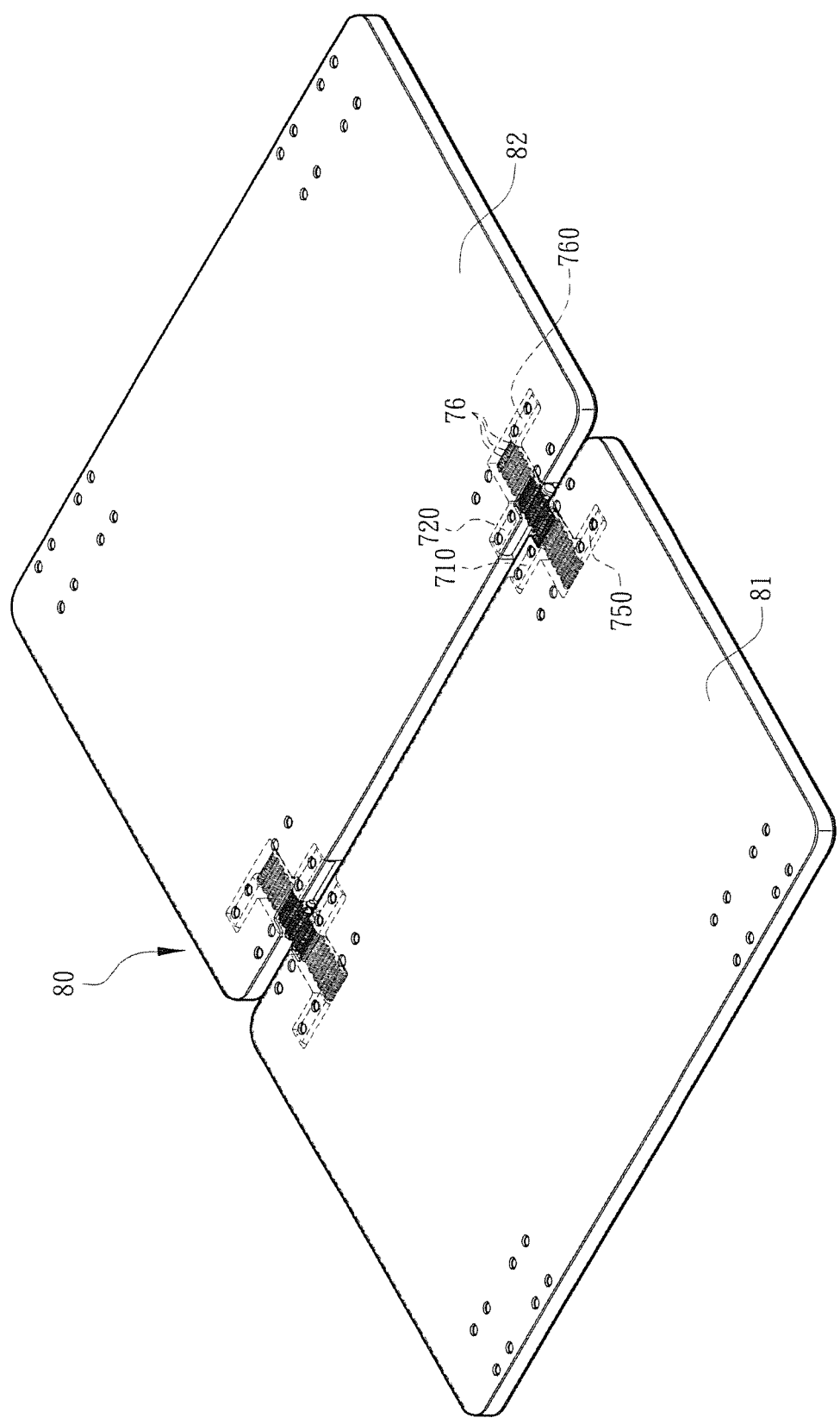
FIG. 8 shows that the present invention is applied to an electronic device.
Figure 9:
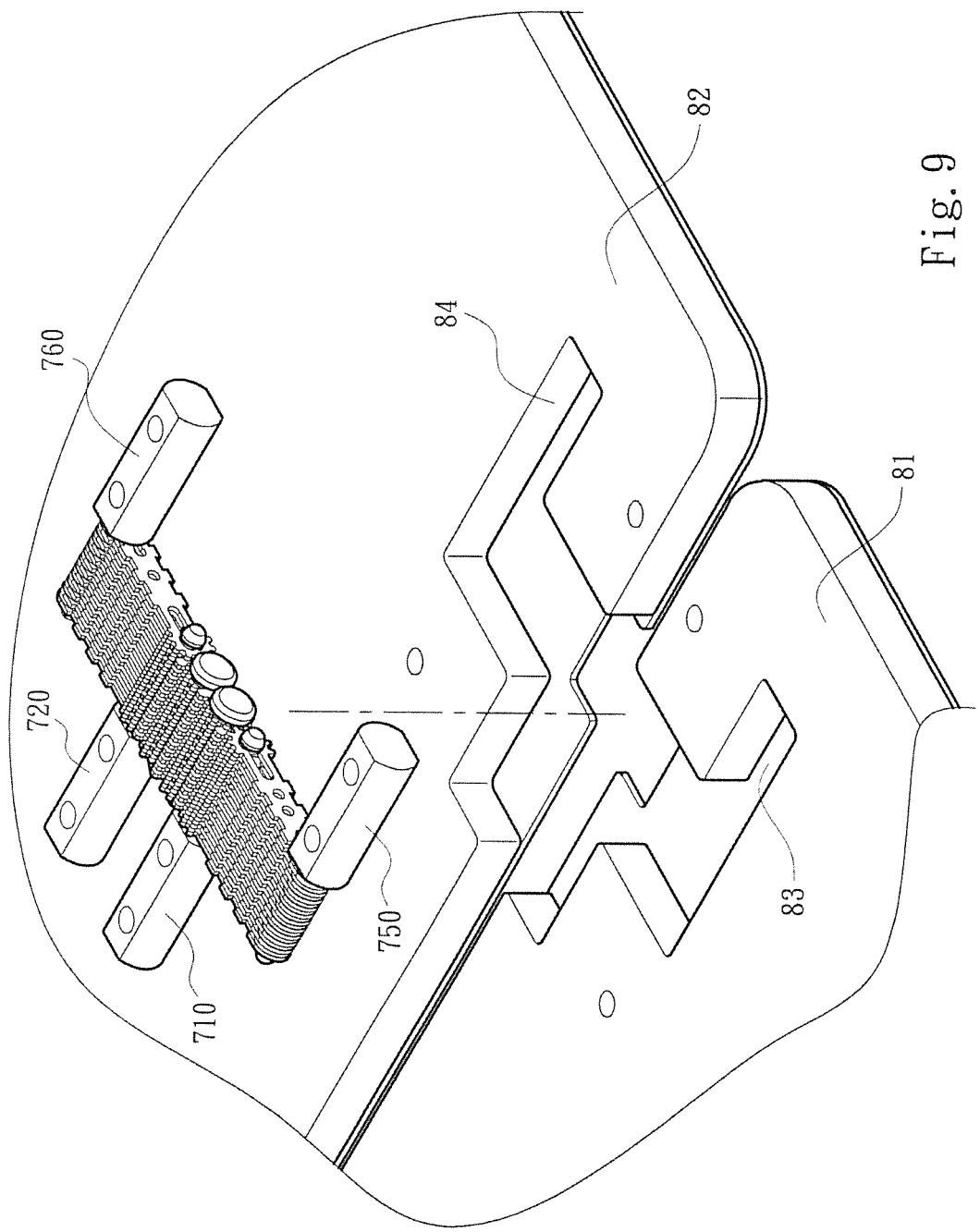
FIG. 9 is an enlarged exploded view of a part of FIG. 8.

FIGS. 8 and 9 show that the above embodiment of the present invention is applicable to an electronic device such as a notebook 80. The notebook 80 includes a base seat 81 as a system end and an upper cover 82 as a display screen end. In this embodiment, the first and second shaft pins 710, 720 and the fifth and sixth shaft pins 750, 760 respectively have extension sections and the base seat 81 and upper cover 82 of the notebook 80 are respectively formed with cavities 83, 84 for receiving the extension sections therein. In addition, the extension sections and the walls of the cavities are formed with corresponding holes for locking and assembling the present invention with the base seat and upper cover.

Figure 10:
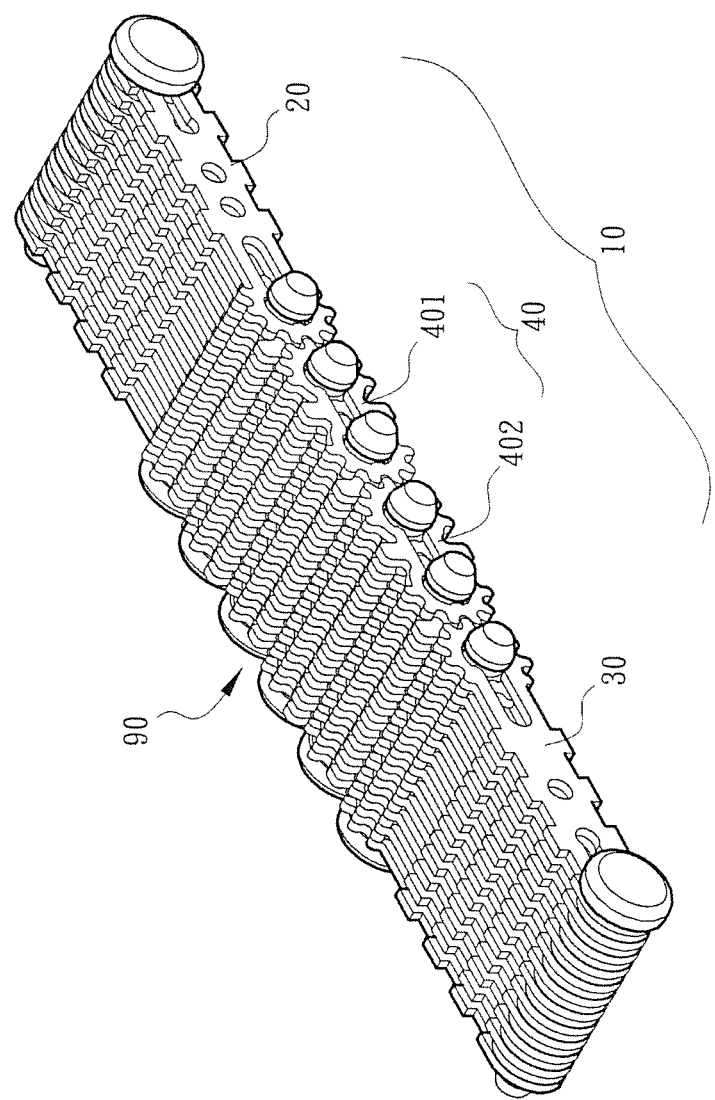
FIG. 10 is a perspective assembled view of a second embodiment of the present invention.
Figure 11:
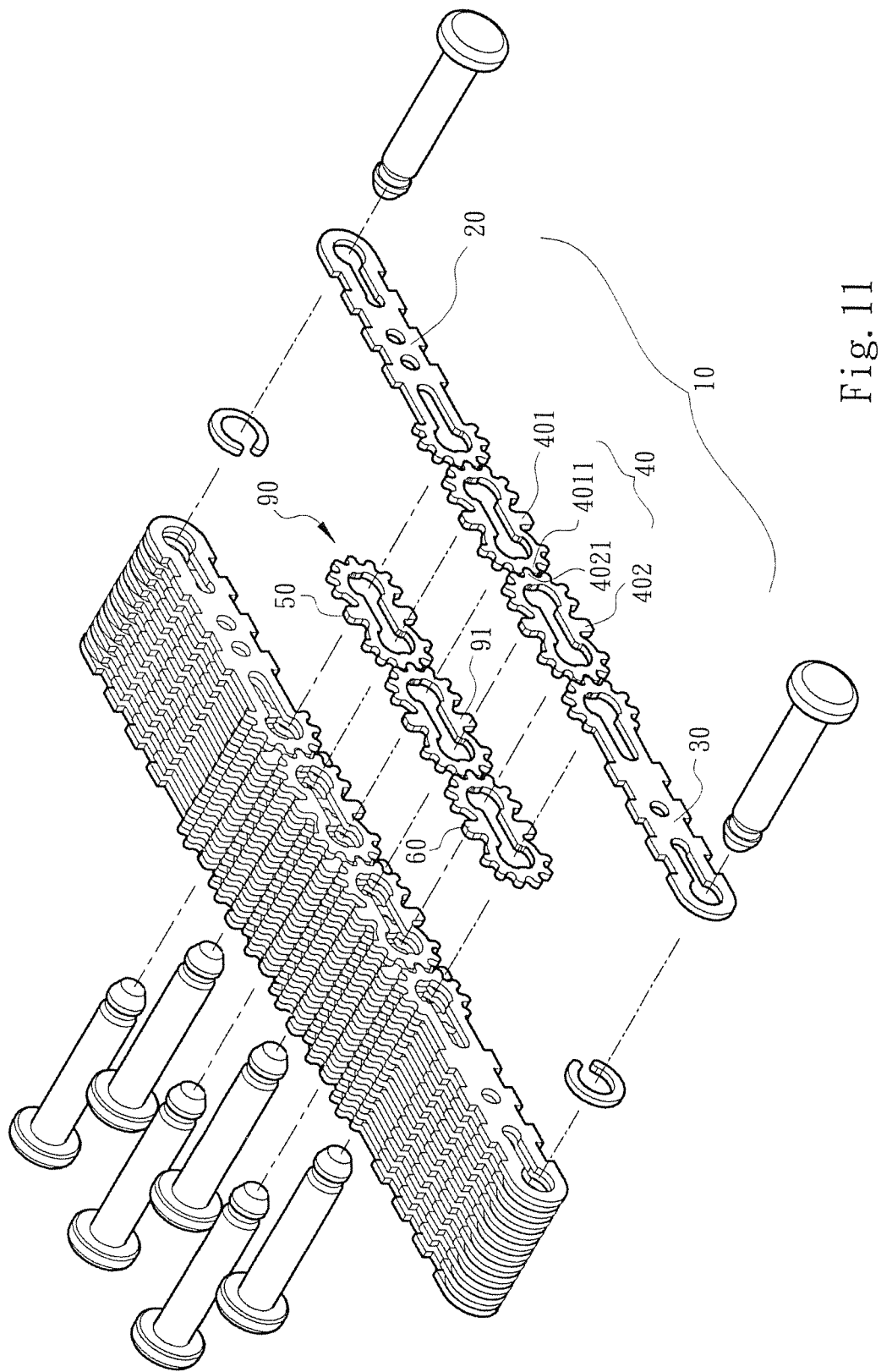
FIG. 11 is a perspective exploded view of the second embodiment of the present invention.

FIGS. 10 and 11 show that the middle link plate assembly 40 is composed of more than two middle link plates 401, 402, which are drivingly engaged with each other. The opposite ends 4011, 4021 of the middle link plates 401, 402 are engaged with each other via synchronous driving sections. The driven joint assembly 90 further includes at least one middle driven plate 91 synchronously drivingly engaged between the first and second driven plates 50, 60. The opposite ends 4011, 4021 of the middle link plates 401, 402 are correspondingly pivotally connected to two ends of the middle driven plate 91. This embodiment can also provide the multi-segment bending/rotation operation.

The multi-segment rotary shaft structure of the present invention has multiple rotational centers so that the rotational freeness of the rotary shaft is greatly enhanced. Moreover, two ends of the multi-segment rotary shaft structure can be synchronously rotated to open or close. Therefore, the multi-segment rotary shaft structure of the present invention is installable on various electronic devices having a main body and a subsidiary body, which can be relatively opened or closed, (such as foldable display, handheld game, personal electronic secretary, mobile phone, electronic book, electronic device case, etc.) The multi-segment rotary shaft structure of the present invention enables a user to more smoothly rotate the electronic device and is novel in configuration.

The above embodiments are only used to illustrate the present invention, not intended to limit the scope thereof. Many modifications of the above embodiments can be made without departing from the spirit of the present invention. For example, in practice, the synchronous driving sections and the connection driving sections can be formed with teeth, which are engaged with each other. Alternatively, the synchronous driving sections and the connection driving sections can have opposite frictional members, intersectional synchronous driving members or other equivalent driving members. All these members can be employed in the present invention.

What is claimed is:

1. A multi-segment rotary shaft structure applicable to an electronic device, the multi-segment rotary shaft structure comprising at least one driving joint assembly and driven joint assembly, the driving joint assembly and the driven joint assembly being pivotally connected and combined into the multi-segment rotary shaft structure, wherein:

the driving joint assembly at least includes a first joint plate, a second joint plate opposite to the first joint plate and a middle link plate assembly, inward end of at least one of the first and second joint plates being formed with synchronous driving section, at least one of two ends of the middle link plate assembly being formed with connection driving section corresponding to the synchronous driving section for synchronously drivingly engaging with the synchronous driving section;

the driven joint assembly is pivotally disposed between the inward ends of the first and second joint plates, the driven joint assembly at least including a first driven plate and a second driven plate opposite to the first driven plate, inward ends of the first and second driven plates being formed with synchronous driving sections, which are synchronously drivingly engaged with each other, inward ends of the first and second joint plates being correspondingly pivotally connected with outward ends of the first and second driven plates, the two ends of the middle link plate assembly being correspondingly pivotally connected with the inward ends of the first and second driven plates; and the driving joint assembly and the driven joint assembly are stringed and pivotally connected to form the multi-segment rotary shaft structure;

wherein multiple driving joint assemblies and multiple driven joint assemblies are stringed and pivotally connected and combined by means of multiple shaft pins to form the multi-segment rotary shaft structure; and the inward ends of both the first and second joint plates are formed with synchronous driving sections and the two ends of the middle link plate assembly are respectively formed with connection driving sections correspondingly engaged with the synchronous driving sections.

2. The multi-segment rotary shaft structure as claimed in claim 1, wherein two ends of the first and second joint plates are respectively formed with outward shaft holes and inward shaft holes, the inward ends of the first and second joint plates being formed with the inward synchronous driving sections opposite to each other, the two ends of the middle link plate assembly being formed with shaft holes, the two ends of the middle link plate assembly being formed with the outward connection driving sections for engaging with the inward synchronous driving sections of the first and second joint plates, the first and second driven plates being respectively formed with two spaced outward shaft holes and two spaced inward shaft holes, the inward shaft holes of the first and second joint plates being respectively linked with the outward shaft holes of the first and second driven plates and pivotally assembled by means of the shaft pins, the shaft holes of the middle link plate assembly being respectively linked with the inward shaft holes of the first and second driven plates and pivotally assembled by means of the shaft pins, then the shaft pins being passed through the outward shaft holes of the first and second joint plates to assemble the same.

3. The multi-segment rotary shaft structure as claimed in claim 2, wherein a protrusion is formed on inner circumference of each of the inward shaft holes of the first and second joint plates and the shaft holes of the middle link plate assemblies and the inward shaft holes of the first and second driven plates to press and fasten the shaft pins fitted in the shaft holes.

4. The multi-segment rotary shaft structure as claimed in claim 1, wherein the middle link plate assembly is composed of at least two middle link plates, which are synchronously drivingly engaged with each other, opposite ends of the middle link plates being formed with synchronous driving sections engaged with each other, the driven joint assembly further including at least one middle driven plate synchronously drivingly engaged between the first and second driven plates, opposite ends of the middle link plates being correspondingly pivotally connected to two ends of the middle driven plate.

5. The multi-segment rotary shaft structure as claimed in claim 1, wherein the driving joint assemblies and the driven joint assemblies are stringed and pivotally connected by means of the shaft pins, the shaft pins having extension sections and the electronic device being formed with corresponding cavities for receiving the extension sections therein.

6. The multi-segment rotary shaft structure as claimed in claim 1, wherein the synchronous driving sections and the connection driving sections are formed with teeth, which are engaged with each other.

7. The multi-segment rotary shaft structure as claimed in claim 1, wherein the synchronous driving sections and the connection driving sections are opposite frictional members.

8. The multi-segment rotary shaft structure as claimed in claim 1, wherein the synchronous driving sections and the connection driving sections are intersectional synchronous driving members.

* * * * *